(12) United States Patent
Karnik et al.

(10) Patent No.: US 8,037,289 B1
(45) Date of Patent: Oct. 11, 2011

(54) METHOD AND APPARATUS FOR CLONING A CONFIGURATION OF A COMPUTER IN A DATA CENTER

(75) Inventors: Neeran Mohan Karnik, Pune (IN); Biraja Sankar Mahapatra, Orissa (IN)

(73) Assignee: Symantec Corporation, Mountain View, CA (US)

( * ) Notice: Subject to any disclaimer, the term of this patent is extended or adjusted under 35 U.S.C. 154(b) by 623 days.

(21) Appl. No.: 12/131,706

(22) Filed: Jun. 2, 2008

(51) Int. Cl.
*G06F 9/00* (2006.01)
*G06F 9/24* (2006.01)
*G06F 15/177* (2006.01)

(52) U.S. Cl. .......................................................... 713/1
(58) Field of Classification Search ........................ 713/1
See application file for complete search history.

(56) References Cited

U.S. PATENT DOCUMENTS

| | | | |
|---|---|---|---|
| 6,498,791 B2 | 12/2002 | Pickett et al. | 370/353 |
| 6,512,526 B1 | 1/2003 | McGlothlin et al. | 345/762 |
| 6,539,456 B2 | 3/2003 | Stewart | 711/113 |
| 6,543,047 B1 | 4/2003 | Vrhel, Jr. et al. | 717/121 |
| 6,550,006 B1 | 4/2003 | Khanna | 713/2 |
| 6,560,606 B1 | 5/2003 | Young | 707/100 |
| 6,564,112 B1 | 5/2003 | Factor | 700/97 |
| 6,577,229 B1 | 6/2003 | Bonneau et al. | 340/10.41 |
| 6,578,141 B2 | 6/2003 | Kelley et al. | 713/1 |
| 6,598,131 B2 | 7/2003 | Kedem et al. | 711/147 |
| 6,601,095 B1 | 7/2003 | Duffield et al. | 709/22 |
| 6,601,166 B1 | 7/2003 | Avyar et al. | 713/2 |
| 6,615,365 B1 | 9/2003 | Jenevein et al. | 714/6 |
| 6,633,916 B2 | 10/2003 | Kauffman | 709/229 |
| 6,662,267 B2 | 12/2003 | Stewart | 711/113 |
| 6,684,327 B1 | 1/2004 | Anand et al. | 713/2 |
| 6,711,688 B1 | 3/2004 | Hubacher et al. | 713/201 |
| 6,748,525 B1 | 6/2004 | Hubacher et al. | 713/1 |
| 6,757,837 B1 | 6/2004 | Platt et al. | 714/4 |
| 6,768,901 B1 | 7/2004 | Osborn et al. | 455/230 |
| 6,802,062 B1 | 10/2004 | Oyamada et al. | 718/1 |
| 6,804,774 B1 | 10/2004 | Larvoire et al. | 713/2 |
| 6,810,478 B1 | 10/2004 | Anand et al. | 713/2 |
| 7,043,724 B2 | 5/2006 | Blume et al. | 717/168 |
| 7,065,566 B2 | 6/2006 | Menard et al. | 709/223 |
| 7,065,637 B1 | 6/2006 | Nanja | 713/1 |

(Continued)

FOREIGN PATENT DOCUMENTS

CN 200810098346 12/2008

(Continued)

OTHER PUBLICATIONS

Open Source Configuration Management—Clone a Server, downloaded from web page http://www.emusoftware.com/content/view/108/203 on Sep. 3, 2008. Copyright Emu Software Inc. 2006.

(Continued)

*Primary Examiner* — Mohammed Rehman
(74) *Attorney, Agent, or Firm* — Campbell Stephenson LLP

(57) ABSTRACT

A method and apparatus for cloning a configuration of a computer in a datacenter is described in the present application. In one embodiment, the method comprises accessing a configuration snapshot for a computer in a data center, wherein the configuration snapshot defines at least one configuration attribute for at least one computer resource and indicates an operating system and at least one software application and provisioning a hardware computer in the data center based on the configuration snapshot.

19 Claims, 3 Drawing Sheets

U.S. PATENT DOCUMENTS

| | | | | |
|---|---|---|---|---|
| 7,082,521 | B1 | 7/2006 | Nanja | 713/1 |
| 7,747,709 | B2* | 6/2010 | Behrendt et al. | 709/220 |
| 2002/0100036 | A1 | 7/2002 | Moshir et al. | 717/173 |
| 2002/0107843 | A1 | 8/2002 | Biebesheimer et al. | 707/3 |
| 2003/0028825 | A1 | 2/2003 | Hines | 714/37 |
| 2003/0167245 | A1 | 9/2003 | Murata | 706/46 |
| 2004/0221146 | A1* | 11/2004 | Baumann | 713/1 |
| 2004/0243692 | A1 | 12/2004 | Arnold et al. | 709/220 |
| 2005/0228789 | A1 | 10/2005 | Fawcett et al. | 707/6 |
| 2006/0101402 | A1 | 5/2006 | Miller et al. | 717/124 |
| 2008/0244028 | A1* | 10/2008 | Le et al. | 709/208 |
| 2008/0301081 | A1 | 12/2008 | Karnik et al. | 706/48 |
| 2009/0040947 | A1* | 2/2009 | Krivopaltsev | 370/255 |

FOREIGN PATENT DOCUMENTS

| | | |
|---|---|---|
| EP | 745929 A1 | 4/1996 |
| EP | 841616 A2 | 5/1998 |
| EP | 1998252 A1 | 12/2008 |
| JP | 2009-048611 | 3/2009 |

OTHER PUBLICATIONS

Ambardar, Sidarth et al., "Dynamic Router Configuration Management for Wireless Mobile Environments," Radio and Wireless Conference (RAWCON '98), IEEE, Aug. 9-12, 1998, IEEE, Aug. 9, 1998, pp. 31-34.

Androutsopoulos, I. et al., "An Evaluation of Naive Bayesian Anti-Spam Filtering," Machine Learning in the New Information Age; 2000, pp. 9-17.

Arshad, Naveed et al., "Deployment and Dynamic Reconfiguration Planning for Distributed Software Systems," Proceedings of the 15th IEEE International Conference on Tools with Artificial Intelligence (ICAI '03), Nov. 3-5, 2003, IEEE Comp. Soc, vol. CONF. 15, Nov. 3, 2003, pp. 39-46.

Basmaciyan, Rober, "Data Center Consolidation—the Logical move," Enterprise Data Center, Sep. 2004, pp. 1-13.

Bose, Indranil; Radha K. Mahapatra; "Business Data Mining—A Machine Learning Perspective—Information & Management," vol. 39, Issue 3, Dec. 20, 2001, pp. 211-225.

Chebrolu, S. et al., "Feature Deduction and Ensemble Design of Intrusion Detection Systems," Computers and Security 24, pp. 295-307, 2005.

Chizi and Maimon, "Dimension Reduction and Feature Selection," Data Mining and Knowledge Discovery Handbook, 005, pp. 93-111.

Cronk, R. et al., "Rule-Based Expert System for Network Management and Operations: An Introduction," IEEE Network, 1988, 11 pages.

Debenham, Clive, "Taos: The operating system," Mar. 1995, Newsgroups: comp. parallel, pp. 1-8.

European Search Report mailed Sep. 12, 2008; EPC Application No. 08009816.3-2211; 10 pages.

Foundation Template Software's Application Developer's Training Course, SNAP 8.0, Module 7, 1997, 37 pages.

Friesenhahn, B., "Autoconf Makes for Portable Software," BYTE, McGraw-Hill Inc.; vol. 22; No. 11; Nov. 1, 1997, pp. 45-46.

Gencay, Eray et al., "SANchk: An SQL-Based Validation System for SAN Configuration," 10th IFIP/IEEE International Symposium on Integrated Network Management, 2007 (IM '07), IEEE, PI, May 1, 2007, pp. 333-342.

Goodman, R. et al., "Rule-Based Neural Networks for Classification and Probability Estimation," Neural Computation 4, pp. 781-804, 1992.

Halle, Sylvain et al., "Self-Configuration of Network Devices with Configuration Logic," Autonomic Networking Lecture Notes in Computer Science, LNCS, Springer, Berlin, DE, vol. 4195, Jan. 1, 2006, pp. 36-49.

Heimbigner, Dennis et al., "A Framework for Analyzing Configurations of Deployable Software Systems," Fifth IEEE International Conference on Engineering of Complex Computer Systems, 1999 (ICECCS '99), Oct. 18-21, 1999, Comput. Soc., pp. 32-42.

Henry, Mike, Intel Corporation, *Extending PXE to Mobile Platforms*, Jun. 1998, pp. 1-4, http://www.intel.com/update/archive/psn/psn06985.pdf.

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf., 97 pp.

Pelikan, M. et al., "Hierarchical Bayesian Optimization Algorithm," Springerlink, 2006, pp. 63-90.

Rho, Sue et al., "Configuring Requirements—Compliant Multi-Agent Systems," IEEE 2nd Symposium on Multi-Agent Security and Survivability, Aug. 30-31, 2005, IEEE, pp. 58-65.

Schuba, Christoph L. et al., "Scaling Network Services Using Programmable Network Devices," Computer, IEEE Service Center, vol. 38, No. 4, Apr. 1, 2005, pp. 52-60.

Simon (simon@yamaha.demon.cok.uk), Note, *Computer Systems Built to Order*, (2 pages).

Tong, Yuchu et al., "A Flexible Multimedia Cooperative Product Design Platform Framework," The 7th International Conference on Computer Supported Cooperative Work in Design, Sep. 25-27, 2002, IEEE, pp. 198-204.

WEB Component, Using the Web Component, Copyright 1997, Template Software, Inc., 65 pp.

WORKFLOW Template, Developing a WFT Workflow System, Whole manual, 1998, 353 pp.

WORKFLOW Template, Using the WFT Development Environment, Whole manual, 1998, 413 pp.

WORKFLOW Template, Using the Web Component, Whole manual, 1998, 66 pp.

* cited by examiner

METHOD AND APPARATUS FOR CLONING A CONFIGURATION OF A COMPUTER IN A DATA CENTER

BACKGROUND OF THE INVENTION

1. Field of the Invention

Embodiments of the present invention generally relate to computer networking and, more particularly, to a method and apparatus for discovering and cloning a configuration of a computer in a data center in an automated manner.

2. Description of the Related Art

A system administrator may desire to provision numerous computers (e.g., servers) in a data center (e.g., a production environment, a server farm and/or the like) with identical or near identical configurations of various computer resources (e.g., software applications, hardware devices, operating system, network components, clustering software and the like). For example, the data center may comprise numerous clones of a particular computer with a gold standard configuration of the various computer resources. Such a gold standard configuration may be based upon the current best practices for data centers.

As an example, such a datacenter may be used by an organization as a disaster recovery site. The numerous clones are provisioned in accordance with the gold standard in order to recover from a loss in productivity due to a disaster (e.g., a flood, a power outage, an inoperative computer and/or the like). The term Disaster Recovery (DR) refers to various actions performed to provide computing resources to a client computer in the event of failure in the data center. The failure can occur due to multiple factors, such as a component failure (such as hardware or software failure), natural disaster, or any other technical disasters (such as virus attacks).

Conventional techniques for provisioning computers (servers) are manual. Hence, such conventional techniques are expensive and do not scale well. Because the servers are manually configured, there is a strong likelihood that errors occurred during the provisioning. Such errors may cause unpredictable problems associated with the software applications running on the servers. Further, such conventional techniques are restricted to provisioning the computers with a limited number of well defined services (e.g., File Transfer Protocol (FTP) file services, Berkeley Internet Name Domain (BIND) Domain Name Service (DNS) services, and APACHE web services) and/or to a specific software application, such as an operating system (e.g., LINUX).

Therefore, there is a need in the art for a method and apparatus for cloning a configuration of a computer in the data center by using a configuration snapshot to provision one or more hardware computers in an automated manner.

SUMMARY OF THE INVENTION

Embodiments of the present invention generally comprise a method and apparatus for cloning a configuration of a computer in a data center. In one embodiment, the method for using a configuration snapshot to clone a computer in a data center comprises accessing a configuration snapshot for a computer in a data center, wherein the configuration snapshot defines at least one configuration attribute for at least one computer resource and indicates an operating system and at least one software application and provisioning a hardware computer in the data center based on the configuration snapshot.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
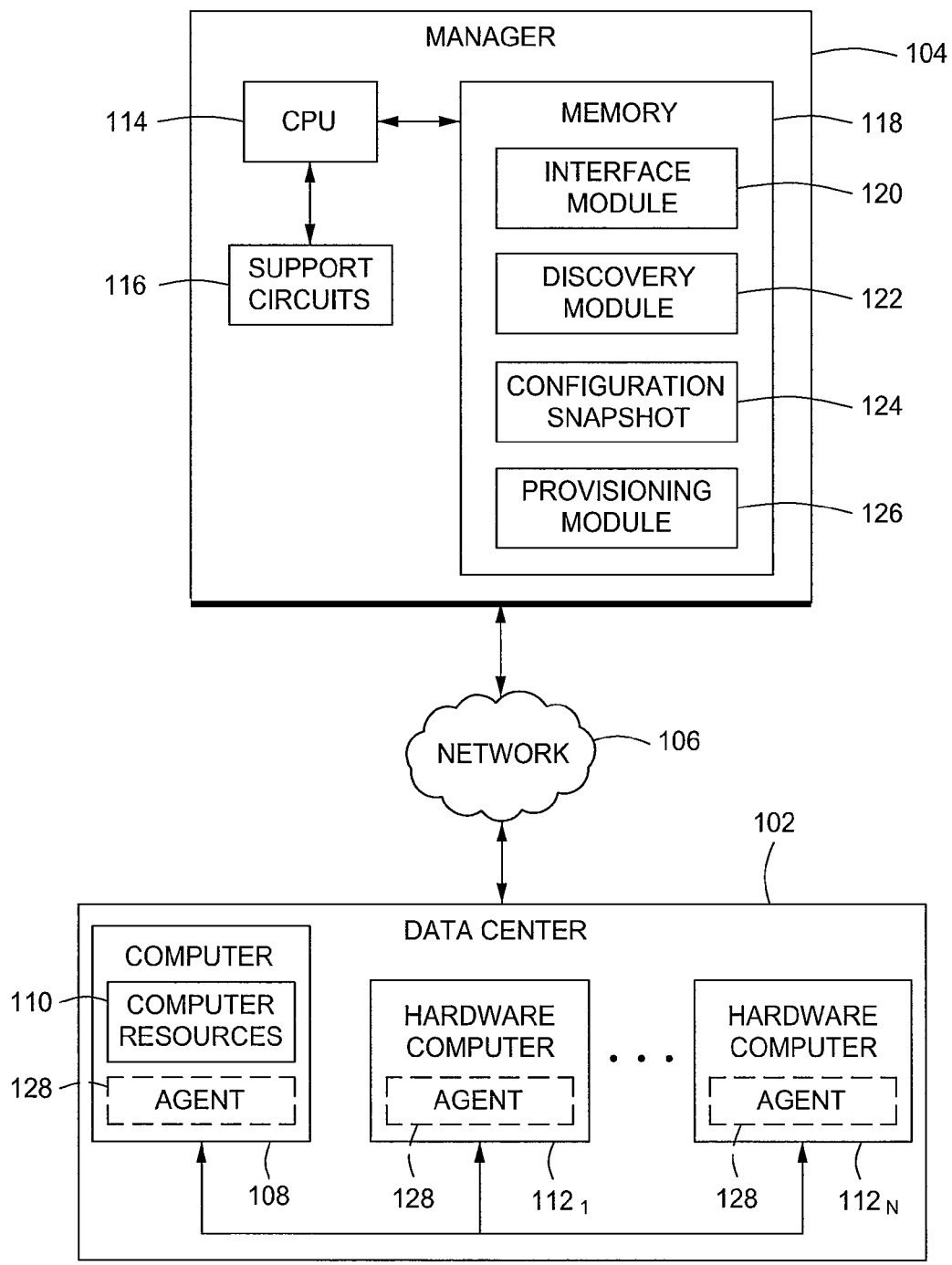
FIG. 1 is a block diagram of a system for using a configuration snapshot to clone a computer in a data center according to an embodiment of the present invention.

FIG. 1 is a block diagram of a system 100 for using a configuration snapshot to clone a computer in a data center according to an embodiment of the present invention. The system 100 includes a manager 104 and a data center 102, each coupled to each other through a network 106.

The manager 104 may be a computing device that comprises a Central Processing Unit CPU 114, support circuits 116, and a memory 118. The CPU 114 comprises one or more commercially available microprocessors or microcontrollers. Alternatively, the CPU 114 may include one or more Application Specific Integrated Circuits, also known as ASIC. The various support circuits 116 facilitate the operation of the CPU 114 and includes one or more clock circuits, buses, power supplies, network cards and/or the like. The memory 118 may be a Read Only Memory (ROM), a Random Access Memory (RAM), an Electrically Erasable Programmable Read Only Memory (EEPROM), a Flash memory, magnetic storage, a removable storage memory and/or the like. The memory 118 further includes an interface module 120, a discovery module 122, a configuration snapshot 124, a provisioning module 126 and an agent 128.

Generally, the data center 102 comprises various computing devices such as, for example, servers, desktop computers, laptop computers, mobile computing devices (e.g., mobile phones and Personal Digital Assistants (PDAs)), and/or the like. The data center 102 further includes a computer 108 and one or more hardware computers 112 (illustrated as a hardware computer $112_1$, a hardware computer $112_2$ . . . a hardware computer $112_N$), each coupled to each other through a network. Those skilled in the art will appreciate that the computer 108 may be a server. The computer 108 comprises one or more computer resources 110 (e.g., software packages, operating systems, hardware devices and/or the like). In one embodiment of the present invention, the computer 108 may include a "gold" standard configuration of the computer resources 110.

The network 106 comprises a communication system that connects a computer system by wire, cable, fiber optic and/or wireless link facilitated by various types of well-known network elements, such as hubs, switches, routers, and the like. The network 106 may further employ various well-known protocols to communicate information amongst the network resources. For example, the network 106 may be a part of the Internet or Intranet using various communications infrastructure, such as Ethernet, WiFi, WiMax, General Packet Radio Service (GPRS) and the like. The network 106 may be a part of a Local Area Network (LAN), a Wide Area Network (WAN) or a Storage Area Network (SAN).

According to various embodiments of the present invention, the discovery module 122 and the provisioning module 126 cooperate to automatically discover and clone a configuration (e.g., the computer resources 110 within the computer 108) by provisioning one or more hardware servers (e.g., the one or more hardware computers 112) using a snapshot of the configuration (e.g., the configuration snapshot 124). In one embodiment, the discovery module 122 examines information regarding the computer resources 110 at the computer 108 in the data center 102 to establish (e.g., take) the configuration snapshot 124. Then the provisioning module 126 accesses the configuration snapshot 124 in order to provision the one or more hardware computers 112 as one or more clones of the computer 108. In another embodiment, the interface module 120 generates a user interface for selecting the computer 108 and/or modifying the configuration snapshot 124.

Generally, a configuration snapshot comprises information regarding a current configuration of a computer to be cloned (i.e., a "gold" standard or optimal configuration of various computer software and hardware resources). In one embodiment, a snapshot of the current configuration of the computer resources 110 at the computer 108 may be taken and stored as the configuration snapshot 124. According to one or embodiments, the configuration snapshot 124 comprises information regarding the computer resources 110 at the computer 108. In one embodiment, the configuration snapshot 124 defines one or more configuration attributes for the computer resources 110. In another embodiment, the configuration snapshot 124 indicates an operating system and/or one or more software applications in use and/or installed on the computer 108. In one embodiment, the one or more configuration attributes for the computer resources 110 includes one or more configuration attributes for the operating system and/or the one or more software applications.

Generally, a hardware computer may be also known as a hardware server or a bare-metal server. The bare metal server is a computer that does not contain an operating system or any software applications. Sometimes, the hardware server or the bare-metal server is a computer in which a virtual machine is installed directly on computer hardware rather than within the host operating system (OS). Hence, the term "bare metal" refers to a hard disk, the usual medium on which the host operating system (OS) is installed. For example, when you purchase a new hard drive it is completely empty, or "nothing but bare metal".

The interface module 120 creates a User Interface (UI) for enabling a system administrator to manage the data center 102, access the configuration snapshot 124 and/or operate the discovery module 122 or the provisioning module 126. According to various embodiments, the system administrator may use the UI to create (e.g., take) or modify the configuration snapshot 124. The system administrator may use the UI to customize (e.g., change, add or subtract) one or more configuration attributes within the configuration snapshot 124. In another embodiment, the system administrator may also change, add or subtract information regarding an operating system and/or one or more software applications to be installed on the one or more hardware computers 112. For example, the system administrator may modify the configuration snapshot 124 to indicate a different operating system and/or one or more additional software applications.

In another embodiment, the system administrator may use the UI to specify a server, (e.g., the computer 108 in the data center 102) to clone. Similarly, one or more hardware servers, for example the one or more hardware computers 112, to be provisioned may be identified by the system administrator through the UI. In one embodiment, the UI may be a Graphical User Interface (GUI) that provides a graphical view of the data center 102 and/or the computer resources 110. The system administrator may select the server to clone from such a graphical view. In another embodiment, the interface module 120 creates a UI that is a command line interface through which the system administrator identifies the server to be cloned by a Media Access Control (MAC) address, a Domain Name Server (DNS) name or an Internet Protocol (IP) address.

The discovery module 122 (e.g., VERITAS Configuration Manager (VCM)) is configured to provide a configuration management solution. The discovery module 122 examines information regarding the computer resources 110 in use at the computer 108 in the data center 102. The discovery module 122 generates (e.g., takes) the configuration snapshot 124 based on the information regarding the computer resources 110. For example, the discovery module 122 examines the information regarding a file system (e.g., a Master File Table, metadata) and/or a registry (e.g., a system registry). Based on such information, the discovery module 122 determines an operating system and one or more software applications that are installed on the computer 108 as well as one or more configuration attributes of the computer resources 110. The discovery module 122 stores such determinations as a portion of the configuration snapshot 124. Hence, the configuration snapshot 124 indicates the operating system and the one or more software applications in use at the computer 108 according to one embodiment.

In one embodiment, the discovery module 122 may be configured to crawl the data center 102 (e.g., the computer 108) and examine the file system information the system registry, Internet Information Services (IIS) metabase (i.e., a repository for IIS configuration values) and the like to obtain information about various software resources (e.g., software applications) installed on the computer 108. The discovery module 122 may extract one or more configuration attributes for each of these software applications.

As described above, the discovery module 122 examines one or more configurations of the computer resources 110 within the data center 102 in an automated manner. The discovery module 122 may be configured to monitor configuration changes within the date center 102 in real time to ensure configuration integrity. The discovery module 122 automatically modifies the configuration snapshot 124 based on any monitored configuration change. Further, the discovery module 122 minimizes application downtime for resolving any problems associated with the configuration changes.

According to one embodiment, the provisioning module 126 installs the operating system and the one or more software applications onto the one or more hardware computers 112 as indicated by the configuration snapshot 124. In one embodiment, the provisioning module 126 accesses a software library to obtain the installation packages associated with the installed operating system and one or more software applications. Furthermore, the provisioning module 126 configures the one or more hardware computers 112 with one or more configuration attributes. The one or more configuration attributes may be selected from the configuration snapshot 124. Alternatively, the one or more configuration attributes may be selected from the configuration snapshot 124 and then, modified.

In one embodiment, the provisioning module 126 creates a virtual machine image onto the one or more hardware computers 112 according to the configuration snapshot 124. The virtual machine image is used for generating the operating system for the one or more hardware computers 112. In an embodiment, the provisioning module 126 clones the computer 108 by deploying one or more virtual machine images to the one or more hardware computers 112. Once the one or more virtual machine images in the one or more hardware computers 112 are mounted, one or more virtual machines are generated to operate as clones of the computer 108.

In an embodiment, the provisioning module 126 is a VERITAS Provisioning Manager (VPM). The provisioning module 126 is configured to enable an end-to-end automated server build process through an integrated workflow for heterogeneous enterprise environments. The provisioning module 126 automates server provisioning and management from a physical bare metal discovery and operating system (OS) installation to applications and patch deployment. The provisioning module 126 further offers broad-scale with rapid deployment capability for high-performance data centers, for example the data center 102.

Depending on the application, various embodiments of the present invention provide an option for copying of the application data during a cloning process. For example, in order to create a clone for Disaster Recovery (DR) purposes, a volume replication process may be required to synchronize application data. Whereas data copying may not be required for scaling out of the stateless servers, or for cluster failover type of usage.

The agent 128 is an optional software package included within the computer 108 and/or the one or more hardware computers 112. In one embodiment, the agent 128 monitors the computer 108 in the data center 102 and identifies a change in a configuration of the computer resources 110. When the agent 128 identifies a change in the configuration of one or more computer resources of the computer resources 110, the agent 128 modifies or updates the configuration snapshot 124 based on this change according to one or more embodiments. The system administrator may decide not to update the configuration snapshot 124 despite the change in the configuration. In another embodiment, the agent 128 may also be configured to support the provisioning of the one or more hardware computers 112. For example, the agent 128 may cooperate with the provisioning module 126 to install one or more software applications and/or an operating system and/or establish one or more configuration attributes for various computer resources on the one or more hardware computers 112.

Figure 2:
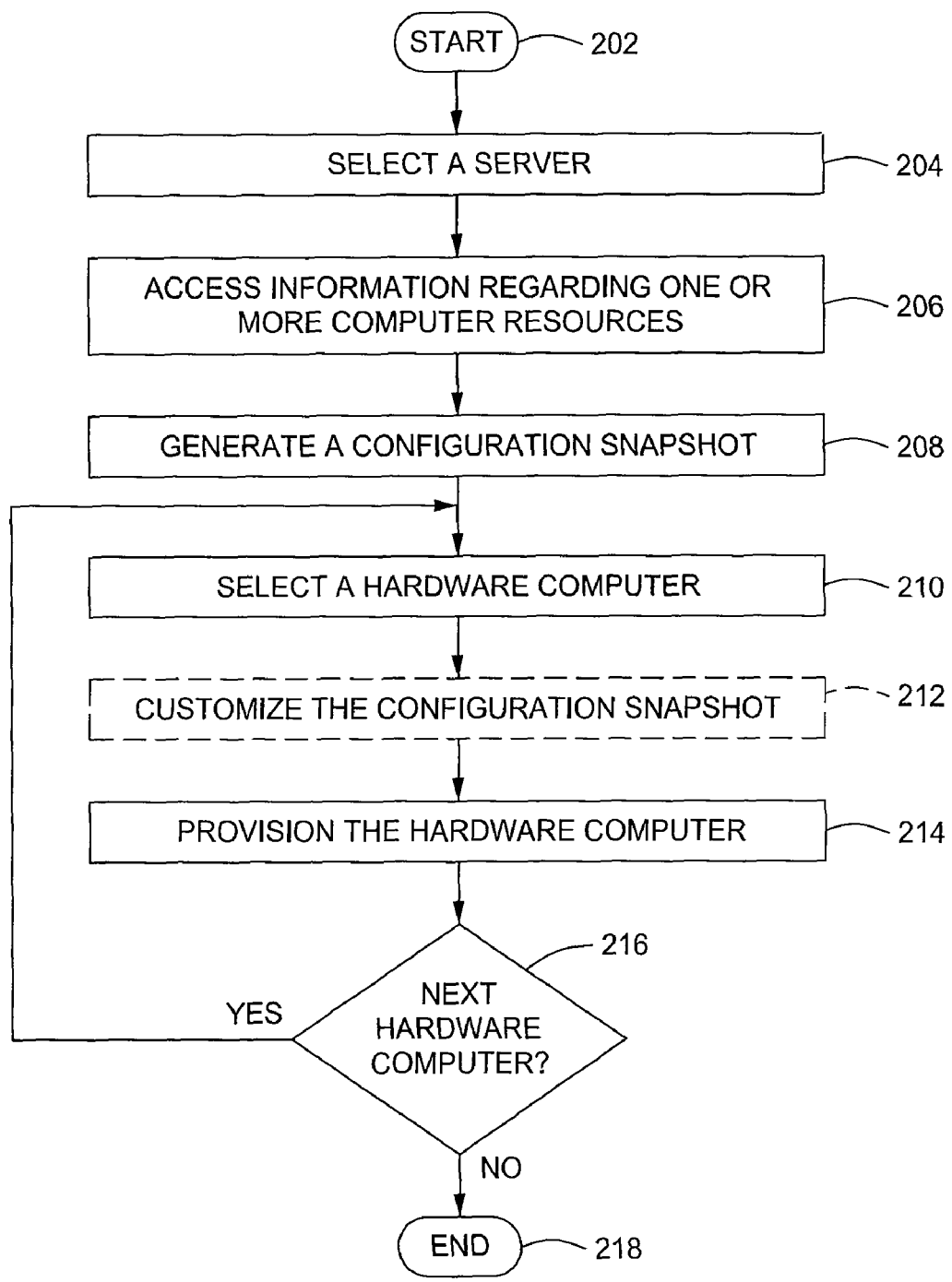
FIG. 2 is a flow diagram of a method for using a configuration snapshot to clone a computer in a data center according to an embodiment of the present invention.

FIG. 2 is a flow diagram of a method for using a configuration snapshot to clone a computer in a data center according to an embodiment of the present invention. The method 200 starts at step 202 and proceeds to step 204.

At step 204, a server, (e.g., the computer 108) is selected. At step 206, information regarding one or more computer resources, is accessed. At step 208, a configuration snapshot, (e.g., the configuration snapshot 124 of FIG. 1) is generated. At step 210, a hardware computer is selected. The method 200 proceeds to step 214 at which the hardware computer is provisioned. Optionally, the method 200 proceeds from the step 210 to step 212 at which the configuration snapshot 124 is customized. Nonetheless, the method 200 proceeds to step 216. At step 216, a determination is made as to whether a hardware computer is next to be provisioned. If there is a hardware computer that is next to be provisioned (option "YES"), the method 200 returns to the step 210. If there is no hardware computer that is next to be provisioned (option "NO"), the method 200 proceeds to step 218. At step 218, the method 200 ends.

Figure 3:
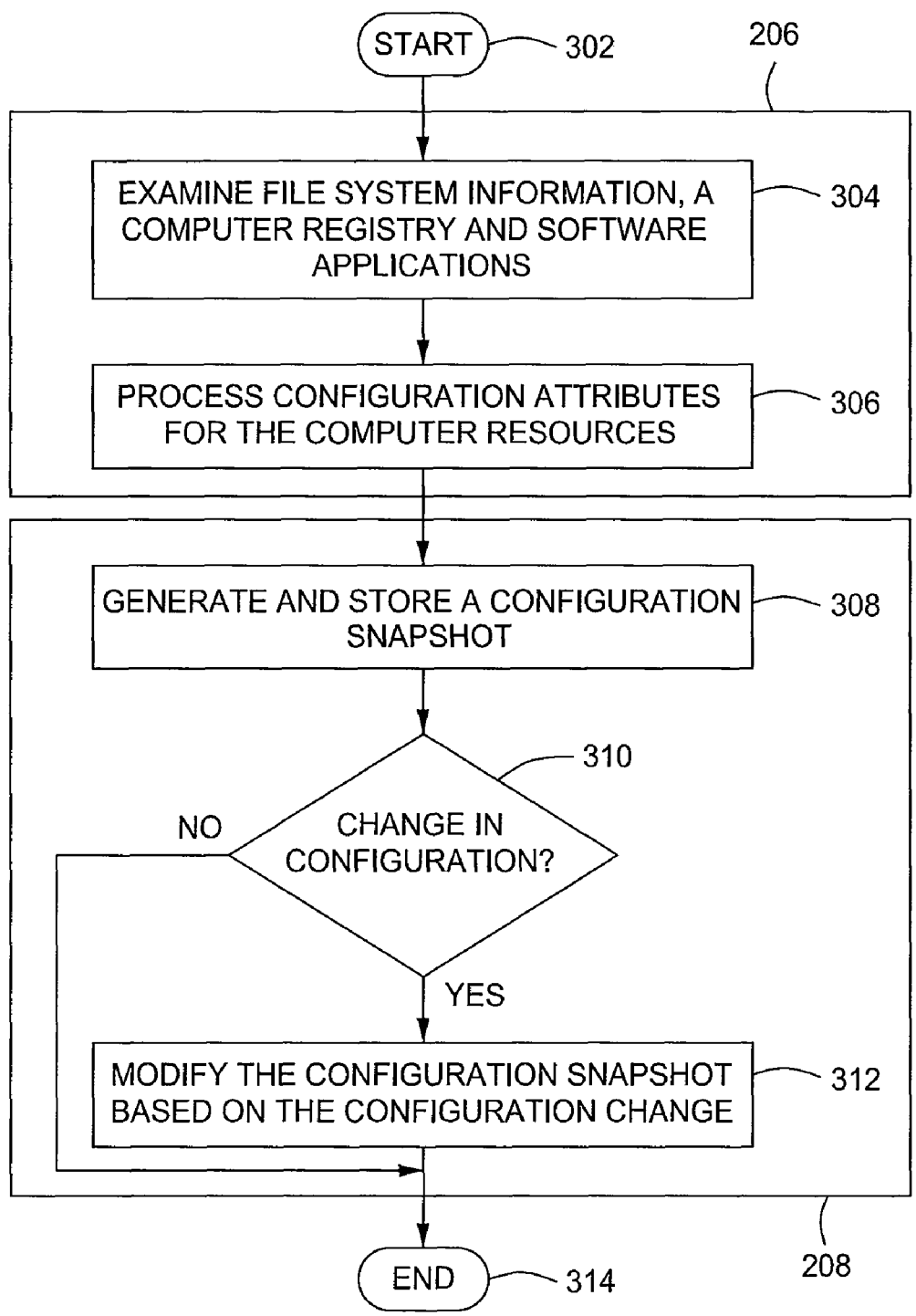
FIG. 3 is a flow diagram of a method for storing a configuration snapshot according to an embodiment of the present invention.

FIG. 3 is a flow diagram of a method for storing a configuration snapshot according to an embodiment of the present invention. The method 300 starts at step 302 and proceeds to step 304.

At step 304, file system information, a computer registry and/or one or more software applications are examined. At step 306, one or more configuration attributes associated with one or more computer resources are processed. In an embodiment of the present invention, the steps 304 and 306 may be an embodiment of the step 206 of the method 200. At step 308, a configuration snapshot is generated and stored. At step 310, a determination is made as to whether there is a change in a configuration. If there is no change in the configuration (option "NO"), the method 300 proceeds to step 314 where the method 300 ends. If there is a change in the configuration (option "YES"), the method 300 proceeds to step 312. At the step 312, the configuration snapshot is modified based on the configuration change. At step 314, the method 300 ends. Steps 308 to 312 may be an embodiment of the step 208 of the method 200 as described above for FIG. 2.

While the foregoing is directed to embodiments of the present invention, other and further embodiments of the invention may be devised without departing from the basic scope thereof, and the scope thereof is determined by the claims that follow.

The invention claimed is:

1. A method for using a configuration snapshot to clone a computer in a data center, comprising:
    examining information regarding a plurality of computer resources in use at a computer in a data center, wherein
        the computer comprises a plurality of computer resources, and
        the plurality of computer resources comprise an operating system and at least one software application;
    generating the configuration snapshot based on the information regarding the
        plurality of computer resources, wherein
        the generating comprises determining that the at least one software application is installed on the computer;
    accessing the configuration snapshot for the computer in the data center,
        wherein the configuration snapshot
            defines at least one configuration attribute for the plurality of computer resources,
            indicates the operating system and the at least one software application, and
            does not include the operating system or the at least one software application; and
    provisioning a hardware computer in the data center, wherein
        the provisioning is based on the configuration snapshot.

2. The method of claim 1, wherein
provisioning the hardware computer further comprises:
    installing the operating system and the at least one software application on the hardware computer, as indicated by the configuration snapshot.

3. The method of claim 2, wherein
installing the operating system and the at least one software application further comprises:
    configuring the operating system and the at least one software application,
        wherein
        the configuring uses a portion of the at least one configuration associated with the operating system and the at least one software application.

4. The method of claim 1, wherein
provisioning the hardware computer further comprises:
    establishing a virtual machine image on the hardware computer in accordance with the configuration snapshot, wherein
        the virtual machine image is used to generate the operating system for the hardware computer.

5. The method of claim 1, wherein
provisioning the hardware computer further comprises:
   configuring the hardware computer using at least a portion of the at least one configuration attribute.
6. The method of claim 1 further comprising:
prior to the provisioning, customizing the configuration snapshot that is used to provision the hardware computer, wherein
   the customizing comprises one or more of
      changing the at least one configuration attribute within the configuration snapshot,
      adding another configuration attribute to the configuration snapshot, or
      deleting the at least one configuration attribute from the configuration snapshot.
7. The method of claim 1, wherein
the information regarding the plurality of computer resources comprises:
   file system information,
   a computer registry, and
   attribute data for configurations of the plurality of computer resources at the computer.
8. The method of claim 1 further comprising:
selecting a computer to be used to produce the configuration snapshot for the data center; and
specifying the hardware computer out of a plurality of hardware computers, wherein
   the hardware computer is to be provisioned using the configuration snapshot, and
   the data center comprises the plurality of hardware computers.
9. The method of claim 1, wherein
the provisioning the hardware computer further comprises:
   cloning the computer in accordance with the configuration snapshot, wherein
      the cloning uses a plurality of hardware computers.
10. The method of claim 1 further comprising:
modifying a configuration of a provisioned hardware computer.
11. The method of claim 1 further comprising:
monitoring the plurality of computer resources to identify a change in a configuration of at least one of the plurality of computer resources; and
modifying the configuration snapshot in response to the change in the configuration of the at least one of the plurality of computer resources.
12. An apparatus comprising:
a discovery module for examining information regarding a plurality of computer resources, wherein
a computer comprises the plurality of computer resources,
the plurality of computer resources comprise an operating system and at least one software application,
the computer is a part of a data center,
the discovery module generates a configuration snapshot,
the discovery module generates the configuration snapshot based on the information regarding the plurality of computer resources, and
   determining that the at least one software application is installed on the computer,
the configuration snapshot
   defines at least one configuration attribute for the plurality of computer resources,
   indicates the operating system and the at least one software application, and
   does not include the operating system or the at least one software application; and
a provisioning module for configuring a hardware computer, wherein
   the provisioning module uses the configuration snapshot for the configuring.
13. The apparatus of claim 12 further comprising:
an agent for monitoring the computer in the data center, wherein
   the agent is further for identifying a change in a configuration of at least one of the plurality of computer resources, and
   the agent identifies the change as an identified change.
14. The apparatus of claim 13, wherein
the agent is further for modifying the configuration snapshot based on the identified change.
15. The apparatus of claim 12 further comprising:
an interface module for generating an interface to enable management of the data center.
16. The apparatus of claim 12, wherein
the provisioning module is further for installing the operating system and the at least one software application on the hardware computer, and
the provisioning module is configured to perform the installation as indicated by the configuration snapshot.
17. A system for using a configuration snapshot to clone a computer in a data center, comprising:
   a data center, comprising:
      a computer having a plurality of computer resources, wherein
         the plurality of computer resources comprise an operating system and at least one software application, and
      a plurality of hardware computers; and
   a manager, comprising:
      a discovery module for examining information regarding the plurality of computer resources in use at the computer, wherein
         the discovery module is further for generating a configuration snapshot based on
            the examining the information regarding the plurality of computer resources, and
            determining the at least one software application that is installed on the computer,
         the configuration snapshot
            defines at least one configuration attribute for the plurality of computer resources,
            indicates the operating system and the at least one software application, and
            does not include the operating system or the at least one software application, and
      a provisioning module for configuring the plurality of hardware computers,
         wherein
            the provisioning module uses the configuration snapshot for the configuring.
18. The system of claim 17 further comprising:
an agent for monitoring the computer in the data center to identify a change in a configuration of the plurality of computer resources.
19. The system of claim 17, wherein
the provisioning module installs the operating system and the at least one software application on the hardware computer, as indicated by the configuration snapshot.

* * * * *